E. M. WOODEN.
SHUTTER MECHANISM.
APPLICATION FILED MAR. 6, 1911.
1,049,554.
Patented Jan. 7, 1913.
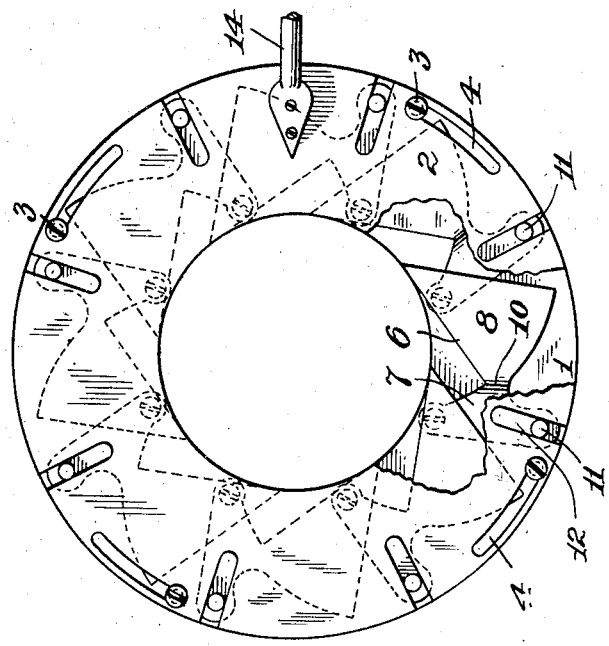
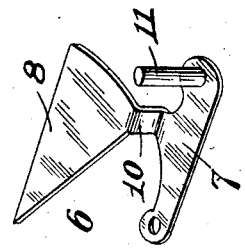
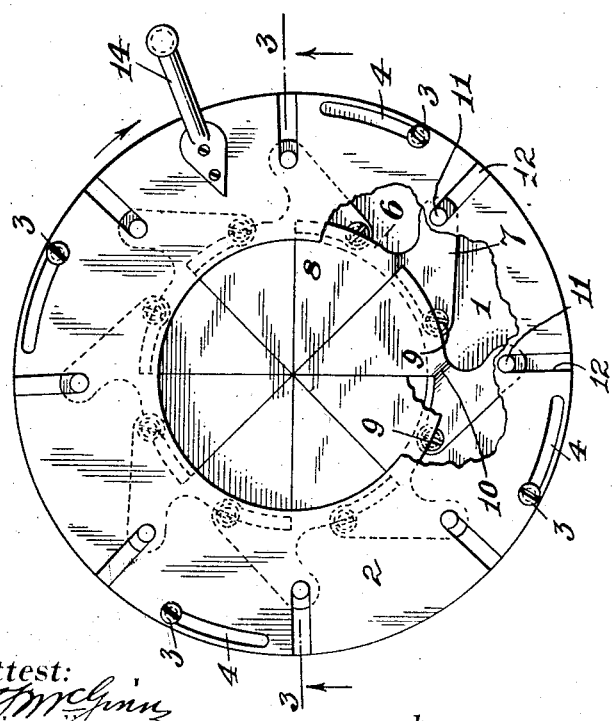
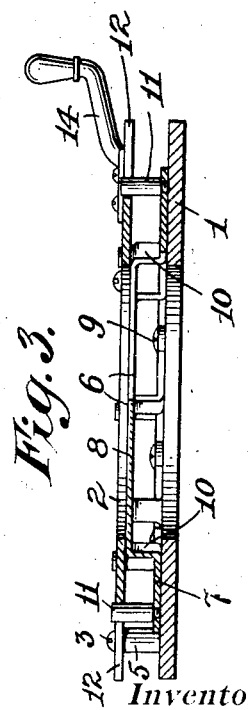
Inventor:
Earl M. Wooden

UNITED STATES PATENT OFFICE.

EARLE M. WOODEN, OF NEW YORK, N. Y., ASSIGNOR OF ONE-THIRD TO ANTHONY B. CAVANAGH, OF NEW YORK, N. Y.

SHUTTER MECHANISM.

1,049,554. Specification of Letters Patent. Patented Jan. 7, 1913.

Application filed March 6, 1911. Serial No. 612,690.

*To all whom it may concern:*

Be it known that I, EARLE M. WOODEN, a citizen of the United States, residing in the borough of the Bronx of the city of New York, in the State of New York, have invented certain new and useful Improvements in Shutter Mechanisms, of which the following is a specification, reference being had to the accompanying drawings, forming a part hereof.

The invention relates to a shutter mechanism for use particularly with moving picture machines or projectors of any kind and especially with such as employ a powerful light for the purpose of displaying pictures which are printed upon a moving film of highly inflammable material, although it will be obvious that the mechanism herein shown and described can be used for various other purposes and in connection with various kinds of apparatus.

One of the objects of the invention, especially when employed in connection with a moving picture machine or projector, is to cut off the light uniformly and circumferentially from the perimeter of the aperture through which the light passes to the center thereof, so that the observer will view a gradually diminishing circle of light until the aperture is entirely closed instead of having the circle of light obliterated by a straight edge passing from one side to the other.

A further object of the invention is to provide a shutter mechanism wherein an aperture will be uniformly and circumferentially opened from the center to its maximum so that the observer will view a gradually increasing circle of light instead of a gradually increasing segment of light.

The various other objects of the invention will be more fully set forth in the following description of one form of mechanism embodying the invention which consists in the new and novel features of construction and combination of parts hereinafter set forth and claimed, reference being had to the accompanying drawings forming a part hereof.

Referring to the drawings:—Figure 1 is a front view of my improved shutter mechanism having the front disk broken away in part to more clearly disclose the construction, the shutter being in its closed position. Fig. 2 represents a corresponding view showing the shutter in its open position. Fig. 3 represents a transverse section on the line 3—3 of Fig. 1, and Fig. 4 represents a detail view of one of the shutter sectors.

Broadly considered, my improved shutter mechanism comprises two parallel apertured disks, suitably spaced apart and one being movable with relation to the other, with a plurality of shutter members arranged between the said disks and pivoted to one of them and provided with means engaging the other disk whereby they are actuated. The disks 1 and 2 are provided with registering central apertures and are secured together by any suitable means as by the screws 3, which are tapped preferably into the disk 1 and engage with slots 4 provided in the disk 2. Preferably spacing sleeves 5 are provided on the screws between the two disks, which hold the disks in their proper spaced relation to each other and also provide a bearing surface for the slotted disk 2 which is movable with relation to the disk 1 to an extent determined by the length of the slots.

The shutter members 6 comprise the arms 7 and the pointed sectors 8, the arms being pivoted to the disk 1 by any suitable means as the screws 9. A plurality of said members are provided, the exact number being relatively immaterial and depending mainly upon the size of the shutter mechanism. In the particular construction shown in the drawings eight sectors are provided, each being adapted to close an angle of 45°. The sectors 8 are in the same plane. Their side edges abut when the shutter is closed and radiate from a common point. The sector and the arm of each shutter member 6 are preferably arranged in different planes, the arm being adapted to slide upon and be guided by the disk 1 and the sector being adapted to slide upon and be guided by the disk 2. Preferably the sector and the arm are made of a single piece of metal connected together by any suitable means as the web or tongue 10. A pin 11 is secured to each of the arms 7 opposite the pivotal point thereof which sets in a radial slot 12 provided in disk 2, the pin being adapted to slide in said slot. A handle 14 or other suitable means is provided upon the upper disk for rotating the same.

In operation a rotary movement of the upper disk with relation to the lower disk will exert a camming action upon the pins which will either project or retract the sectors, depending upon the direction of motion of the disk. When the parts are in the position shown in Fig. 1 and the lever is moved in the direction indicated by the arrow, the pins will be drawn outward toward the periphery of the disk and the sectors will be pulled in the same direction, thereby opening the central apertures of the disks. When the upper disk 2 is forced in the opposite direction, however, (the parts being at that time in the position shown in Fig. 2), the disk will exert a camming action upon the pins and will force the sectors inward across the central apertures and thereby close the same. The arrangement of the sectors and the arms in different planes permits each sector to overlap the arm of the adjacent member when the aperture is open as shown in Fig. 2.

By means of this construction an extremely rapid concentric opening of the central aperture of the disks is obtained, and similarly the central opening can be quickly and uniformly closed. The impression made upon the eye of the observer is quite different from the impression made if the aperture is closed by having a plate or straight edge of any kind drawn across the same and the vision is focused as it were, upon a gradually decreasing or a gradually increasing substantially circular area of light rather than being shifted and distracted by an increasing or decreasing projection of irregular shape. Consequently the shutter is particularly useful in producing what are commonly known as dissolving views.

Although I have shown and described my invention as applied to shutter mechanism, it is obvious that the same may be applied in connection with many different kinds of mechanism and apparatus and that various changes may be made in the details of construction and arrangement of parts without departing from the spirit of the invention provided the means set forth in the following claims be employed.

I claim as my invention:

1. A shutter mechanism comprising two disks parallel with each other and spaced apart, one of said disks being movable with relation to the other, a plurality of shutter members comprising arms pivoted to one of said disks and having sliding engagement therewith and sectors connected to said arms and all disposed in the same plane, parallel to said arms but in a different horizontal plane therefrom, and means engaging said members to actuate the same upon relative movement of the two disks.

2. A shutter mechanism comprising two disks parallel with each other and having central apertures therethrough one of said disks being movable with relation to the other, and a plurality of shutter members comprising arms pivoted to one of said disks and sectors connected to said arms and actuated thereby said sectors normally abutting at their adjacent edges to close said apertures, and being disposed in the same horizontal plane and parallel to but in a different plane from said arms.

3. In a shutter mechanism the combination with a stationary disk having a central aperture therethrough, a corresponding disk movably mounted on said stationary disk and means for holding said disks in spaced relation to each other, of a plurality of shutter members each comprising an arm having a bearing on the stationary disk and pivoted thereto and a sector having a bearing on the movable disk said arm and sector being secured together by an integral web, and a pin secured to each arm, said movable disk having a radial slot engaging said pin whereby the shutter members are actuated to open and close the central aperture through said disks by a rotary movement of the movable disk.

This specification signed and witnessed this 23rd day of February, A. D., 1911.

EARLE M. WOODEN.

Signed in the presence of—
N. A. SMITH,
HELEN M. DAMES.

---

Copies of this patent may be obtained for five cents each, by addressing the "Commissioner of Patents, Washington, D. C."